Nov. 18, 1952  E. C. MERSEREAU  2,618,169
HAND BRAKE MECHANISM

Filed Nov. 15, 1950  2 SHEETS—SHEET 1

INVENTOR.
EVERARD C. MERSEREAU.
BY Ward, Crosby & Neal
ATTORNEYS.

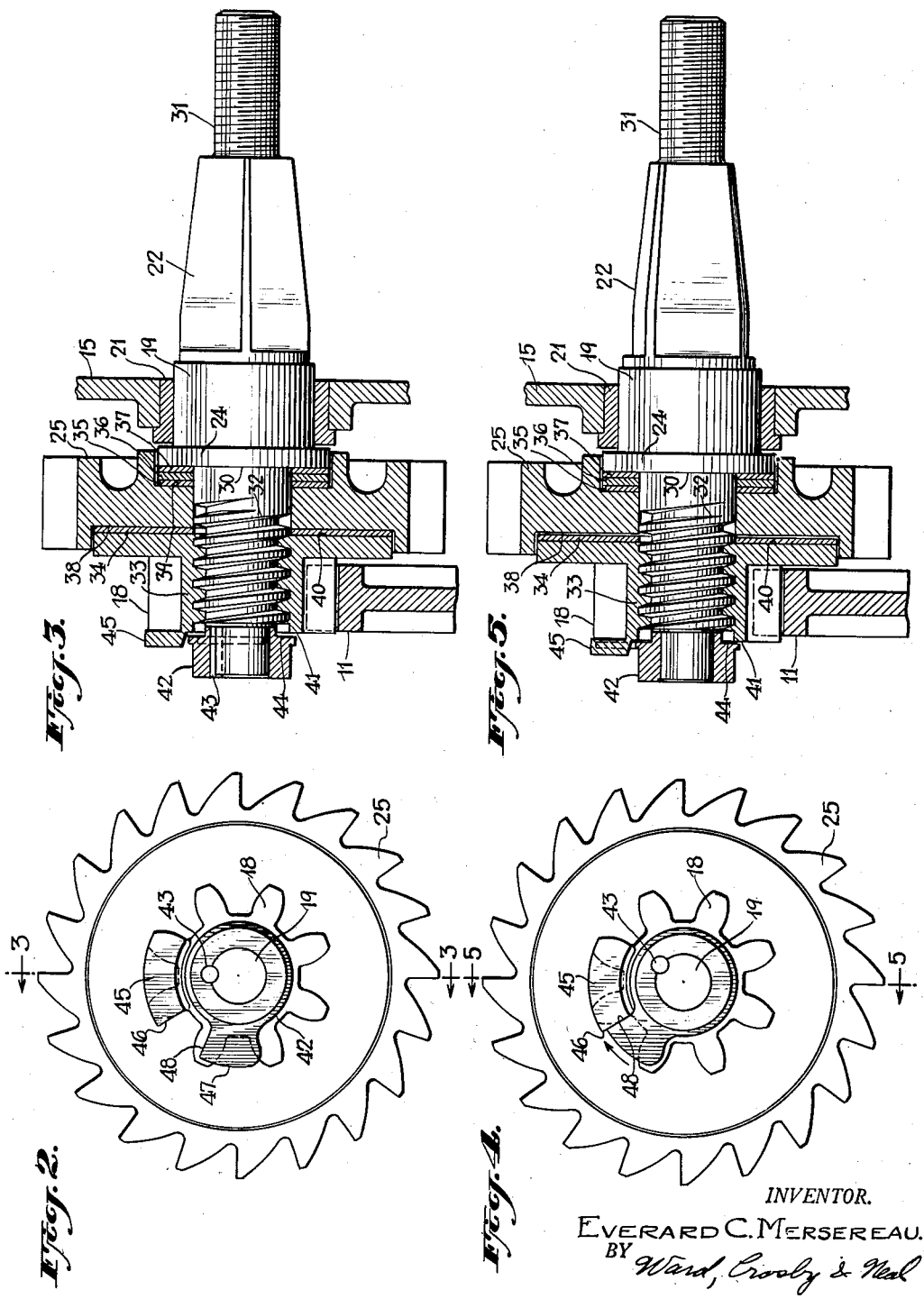

Patented Nov. 18, 1952

2,618,169

UNITED STATES PATENT OFFICE 2,618,169

HAND BRAKE MECHANISM

Everard C. Mersereau, Westfield, N. J., assignor to National Brake Company, Inc., New York, N. Y., a corporation of New York Application November 15, 1950, Serial No. 195,776

13 Claims. (Cl. 74—505)

This invention relates to brake mechanisms and particularly to hand brake mechanisms for railway cars in which a friction clutch is employed intermediate a manually operated shaft and a detent wheel for holding a brake rigging take-up drum.

Hand brake mechanisms, employing a friction clutch to interconnect a detent wheel with a manually operated shaft which, in cooperation with a gear train, rotates a brake rigging take-up drum, are well known and may, for example, take the form shown in United States Patent No. 2,310,135. Generally, in such mechanisms, the manually operated shaft has an enlarged portion or a collar with a face perpendicular to the axis of the shaft and a threaded portion acting as a cam. A pinion gear, which is part of the take-up drum gear drive train and which has threads providing cam engaging surfaces, is mounted with its threads in engagement with the threads of the threaded portion of the shaft. A detent member, such as a detent wheel, is rotatably mounted on the shaft between the pinion and the face of the enlarged portion of the shaft, and a pair of clutch discs are mounted on the shaft, one between the detent wheel and the pinion and one between the detent wheel and said face.

When the above-mentioned shaft is rotated in one direction, the pinion moves axially of the shaft because of its engagement with a drum driven gear and because of the threads. In this manner, the pinion clamps the detent wheel between the clutch discs causing it to rotate with the shaft. When the shaft is rotated in the opposite direction, the pinion moves away from the detent wheel, unclamping the wheel and permitting the shaft and pinion to rotate with respect to the wheel. However, the movement of the pinion away from the detent wheel is stopped only by engagement of the pinion or an associated member with the face of a shoulder or collar on the shaft or with the face of a housing or bearing supporting the shaft, the face, in each instance, being substantially perpendicular to the axis of the pinion. Thus, when it is necessary to apply torque to the shaft sufficient to forcibly release the brake rigging or when the torque is applied to the shaft in the release direction after the rigging is fully released, the pinion is forced against the associated stop and may become jammed thereagainst. Such jamming is undesirable because when the shaft is again rotated in the take-up direction, the pinion will not readily move toward the detent wheel and cause it to rotate with the shaft, particularly if the pinion is jammed against the stop for a time sufficient for rust to form. This difficulty may be so serious, in fact, that the brakes of a car may be applied without rotation of the detent wheel and hence, without its aid, and in this event, it will not be possible to hold the brake in an applied position.

It is an object of my invention to overcome the above-mentioned difficulty and thereby to provide a clutch operated hand brake mechanism which is free from jamming.

Accordingly, it is an object of my invention to provide an improved hand brake mechanism which is reliable in operation.

Other objects and advantages of my invention will be apparent from the detailed description of the invention given hereinafter by way of example only and setting forth the manner in which I now prefer to practice the invention.

In accordance with my invention, the operating shaft of the brake mechanism, which causes axial movement of the pinion, is provided with a stop member which applies force to the pinion substantially only in a tangential direction and prevents further axial movement of the pinion after the pinion has moved axially a distance sufficient to unclamp the detent wheel.

In the preferred embodiment of my invention, a radially extending member is mounted on the shaft, and this member has a stop portion spaced radially from the axis of the shaft and which extends into the helical path followed by a stop engaging portion of the pinion as the pinion moves axially away from the detent wheel. Preferably, the faces of the stop portion and the stop engaging portion of the pinion lie in a plane or planes passing through the axis of the shaft so that substantially no axial force is applied to the pinion in its stopped position.

My invention may be better understood by referring to the following detailed description of the invention and to the accompanying drawings, in which:

Fig. 2 is an end elevation view of the driving mechanism of my invention showing the component parts thereof in the positions assumed during application of the brakes of a vehicle on which the mechanism is mounted;

Fig. 3 is a side elevation view, partly in section and taken along the line 3—3 indicated in Fig. 2, of the mechanism shown in Fig. 2;

Fig. 4 is an end elevation view of the driving mechanism of my invention showing the components thereof in the positions assumed when the brakes of the vehicle on which the mechanism is mounted are released;

Figures 6, 7:
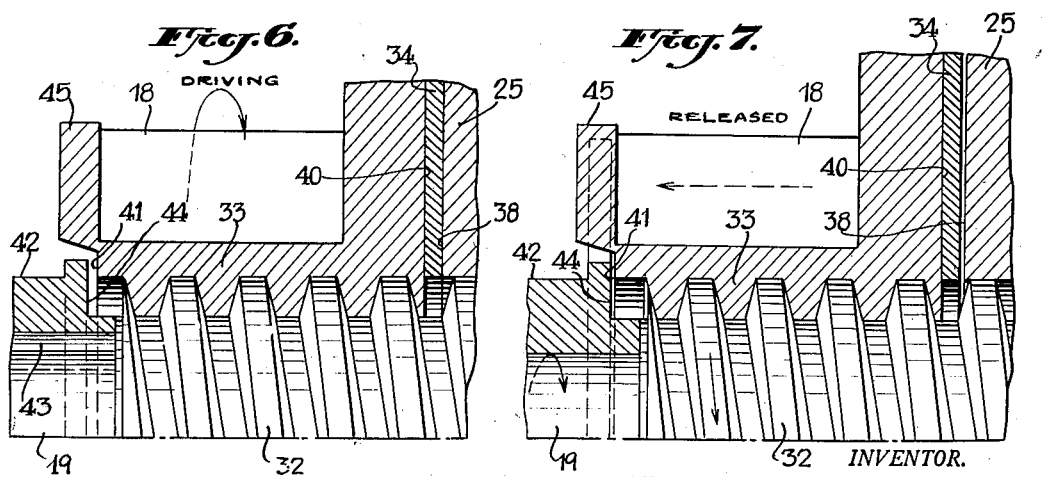

Fig. 5 is a side elevation view, partly in section and taken along the line 5—5 indicated in Fig. 4, of the mechanism shown in Fig. 4; and Figs. 6 and 7 are enlarged fragmentary views, partly in section, of the mechanism shown in Figs. 3 and 5 respectively.

Figure 1:
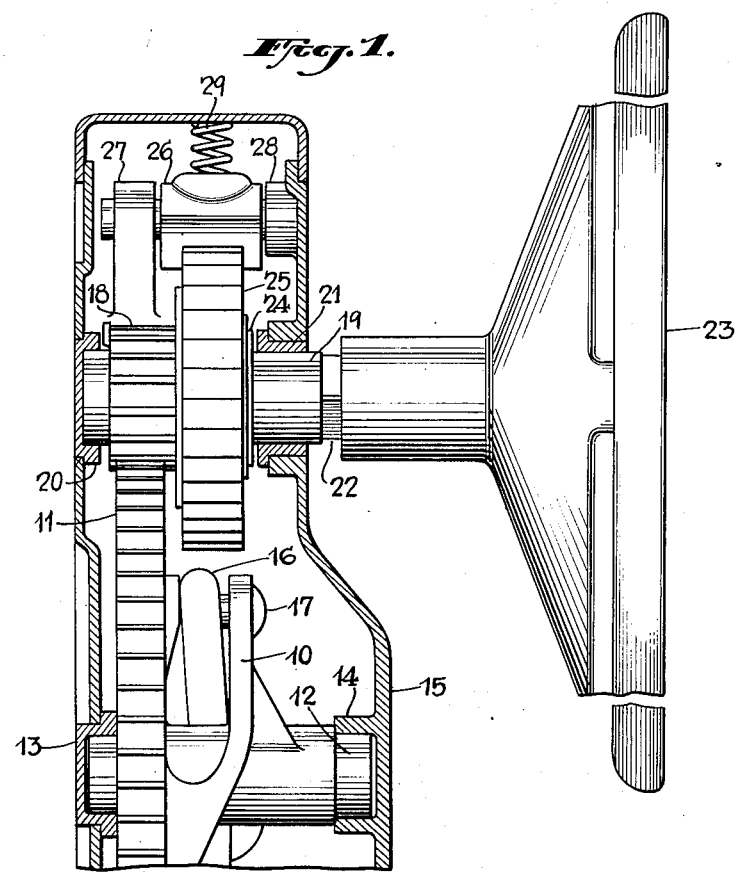
Fig. 1 is a fragmentary side elevation view, partly in section, of a brake mechanism incorporating my invention.

Referring to Fig. 1, the brake operating mechanism comprises a drum 10 rotatable by a gear 11 which may be rigidly connected to the drum 10. The drum 10 and the gear 11 may be mounted on a shaft 12 which may be journalled at its ends in bearings 13 and 14 mounted on the housing 15. The drum 10 operates the brake rigging of a vehicle on which it is mounted and may be connected therewith by a chain 16 which is fastened to the drum 10 by a pin 17.

The gear 11 is rotated by a pinion 18 which in turn is rotated by a shaft 19 supported by bearings 20 and 21 mounted on the housing 15. The shaft 19 may have a square tapered portion 22 which carries a manually operable member, such as hand wheel 23, for manually rotating the shaft 19.

The shaft 19 may have an enlarged portion 24 which, as will be explained in detail hereinafter, cooperates with the pinion 18 to rotatably clamp a detent member, such as a detent wheel 25, causing the detent wheel 25 to rotate with the shaft 19 when the hand wheel 23 is rotated in a clockwise direction, as viewed from the right in Fig. 1.

The detent wheel 25 cooperates with a pawl 26 pivotally supported by arms 27 and 28 which may be integral with the housing 15. The pawl 26 is pressed into engagement with the teeth on the periphery on the detent wheel 25 by a spring 29. Thus, when the brakes of a vehicle on which the brake mechanism may be mounted are operated by the mechanism, the brakes are held in their operated condition by the cooperation of the detent wheel 25, pawl 26 and the clutch mechanism, including the clutch member 24 and the pinion 18 until the hand wheel 23 is rotated in a counterclockwise direction.

As shown in the remaining figures of the drawings, the driving mechanism of my invention may comprise the shaft 19 having the enlarged portion 24 which has a face 30 substantially perpendicular to the axis of the shaft 19. The portion 24 is a clutch member and is preferably formed integrally with the shaft 19, but it may also be a separate collar pressed on the shaft or otherwise fastened thereto so as to be rotatable therewith. The hand wheel 23 shown in Fig. 1 may be held on the tapered portion 22 of the shaft 19 by means of a nut (not shown) in threaded engagement with threads 31 on the end of the shaft 19.

The shaft 19 may also have a threaded portion 32 which, in cooperation with a threaded portion 33 of the pinion 18, moves the pinion 18 axially upon relative rotational movement of the pinion 18 and the shaft 19. The threads of the portion 32 act as a cam having helical surfaces which engage the helical surfaces of the threaded portion 33 of the pinion 18.

A plurality of clutch discs 34, 35, 36 and 37 are mounted on the shaft 19 between one surface 38 of the detent wheel 25 and the pinion 18 and between another surface 39 of the detent wheel 25 and the clutch member 24. When the shaft 19 is rotated in a clockwise direction, as viewed from the right in the figures of the drawings, the pinion 18 because of its engagement with the gear 11 and because of the threaded portions 32 and 33 moves axially to the right clamping the clutch discs 34—37 and the detent wheel 25 between the surface 40 of the pinion 18 and the surface 30 of the clutch member 24. When sufficient pressure is applied to the clutch discs and the detent wheel 25, the friction between the clutch discs and the surfaces 30, 38, 39 and 40 is such that the detent wheel 25 rotates with the shaft 19. As long as the shaft 19 is not turned in the counterclockwise direction, there will be sufficient friction between the detent wheel 25, the clutch discs, the pinion 18 and the clutch member 24 to prevent rotation of the shaft 19 in the counterclockwise direction and hence, to prevent release of the brake rigging controlled by the drum 10. However, when the shaft 19 is rotated in the counterclockwise direction by the hand wheel 23, the pinion 18 because of its engagement with the gear 11 and because of the threaded portions 32 and 33 moves axially away from the detent wheel 25, thereby reducing the friction between the clutch discs and the surfaces of the detent wheel 25, the pinion 18 and the clutch member 24. When the friction is reduced, the pinion 18 is free to rotate under pressure from the gear 11 and the brakes of the associated vehicle will be released to an extent controlled by counterclockwise rotation of the hand wheel 23, as described in the aforementioned patent.

If, when the shaft 19 is turned in the counterclockwise direction, the gear 11 is not rotated by the pull of the brake rigging, it may be necessary to rotate the shaft 19 an amount sufficient to cause the pinion 18 to drive the gear 11 in a direction opposite to the direction in which it was turned when the brakes were applied. When the shaft 19 was so rotated in the counterclockwise direction, in previously known brake mechanisms of this type, the surface 41 of the pinion 18 was forced against a face of a stop member, such as a surface 44 of a collar 42 mounted on the end of the shaft 19 and fastened thereto as by a pin 43. The pinion 18 was, therefore, jammed against the stop member. Similarly, if the brakes were fully released and the shaft 19 was turned in the counterclockwise direction, the pinion 18 would also become jammed against the stop member. Such jamming made the pinion 18 difficult to release and to return to the clutch engaging position in which position the detent wheel 25 is rotated with the shaft 19. The jamming caused increased difficulty if the jamming continued for a period of time sufficient for rust to form between the surface 41 and the stop member.

In accordance with the preferred embodiment of my invention, the surface 41 of the pinion 18 is prevented from coming into contact with the surface of a stop member, such as the surface 44 of the collar 42 by providing a stop engaging portion 45 on the pinion 18 and by providing a stop member which rotates the pinion 18, when the detent wheel 25 is unclamped, by applying rotating force to the pinion 18 substantially only in a tangential direction. As used in this specification and in the claims appended hereto, a force applied tangentially to the pinion 18 is intended to mean a force applied transversely to the axis of the pinion 18 at a point on the pinion or a member associated therewith spaced from the axis of the pinion.

Although in the preferred embodiment of my invention, the surface 41 of the pinion 18 is prevented from coming into contact with the surface 44 of the stop member 42, contact between these surfaces is permissible and is within the scope of the invention provided that the pressure exerted by one surface upon the other is not sufficient to cause the pinion 18 to jam against the stop member 42. The amount of pressure between the surfaces which can be tolerated without jamming depends on several factors well known to those skilled in the art, such as, for example, materials employed, thread pitch, surface finishes, etc.

The stop engaging portion 45 has, as shown in Figs. 2 and 4, a face 46 which lies within a plane passing through the axis of pinion 18 but which may also be considered as facing in a direction transverse to the axis of the pinion 18. The stop member 42 has an arcuate portion 47 which also has a face 48 lying within a plane passing through the axis of the pinion 18. It will be noted that the pinion 18, the stop member 42 and the shaft 19 are coaxial.

Since, in order to prevent the jamming mentioned above, it is desirable that no force parallel or radial to the axis of the pinion be exerted between the stop member 42 and the pinion 18, it is preferred that the surfaces 46 and 48 lie in a plane or planes which pass through the axis of the pinion 18 or in planes within a few degrees thereof. In all cases, the planes of the surfaces 46 and 48 preferably are substantially parallel to the axis of the pinion 18 and substantially pass therethrough.

Referring now to Figs. 2 and 6, it will be seen that when the shaft 19 is rotated in the direction required to apply the brakes of an associated vehicle, the surface 41 is separated from the surface 44 and the pinion 18 presses its surface 40 against the clutch disc 34. In this position, the face 46 of the stop engaging portion 45 is separated in a circumferential direction from the face 48 of the arcuate portion 47. The separation of the faces 46 and 48 occurs because the shaft 19 is turned in a clockwise direction to cause the pinion 18 to clamp the detent wheel 25.

Referring next to Figs. 4 and 7, the pinion 18 moves axially to the left when the shaft 19 is turned in a counterclockwise direction to release the brakes of an associated vehicle. The separation between the surfaces 41 and 44 accordingly becomes less and the faces 46 and 48 become engaged with each other. The positions of faces 46 and 48 are so related to the pitch of the threaded portions 32 and 33 and the spacing of the surfaces 41 and 44 that the faces 46 and 48 become engaged before the pinion 18 contacts any portion of the stop member 42 other than the face 48. For example, when the detent wheel 25 is clamped by the pinion 18, the faces 46 and 48 may be approximately 60 degrees apart and the surfaces 41 and 44 may be separated by slightly more than one-sixth of the thread pitch. As the clutch discs wear with use, the separations become proportionately greater. Further rotation of the shaft 19 in a counterclockwise direction causes the stop member 42 to rotate the pinion 18 and thus to turn the gear 11.

It will be noted that since the force applied to the face 46 by the face 48 is substantially in a tangential direction, these faces do not jam together and hence, when it is again desired to apply the associated brakes, the shaft 19 may readily be turned and the pinion 18 will again clamp the detent wheel 25 between the clutch discs 34 and 35.

Having thus described my invention with particular reference to the preferred form thereof and having described certain modifications, it will be obvious to those skilled in the art to which the invention pertains, after understanding my invention, that various changes and other modifications may be made therein without departing from the spirit and scope of my invention, as defined by the claims appended hereto.

What is claimed as new and desired to be secured by Letters Patent of the United States is:

1. A brake operating mechanism comprising a pinion having a portion facing in a direction transverse to its axis, a take-up drum drivingly connected with said pinion, a rotatable shaft, means operable by said shaft for moving said pinion axially in two opposite directions and into first and second predetermined positions, means rotatable by said shaft and engageable with said portion of said pinion in said first position for rotating said pinion and means rotatable by said shaft and engageable with said pinion in said second position for rotating said pinion and said drum.

2. In a brake operating mechanism, an operating shaft, a pinion connected to said shaft, means operable by said shaft for moving said pinion axially in two opposite directions upon relative rotation between said shaft and said pinion, a detent member adapted to be clamped to and unclamped from said pinion by such axial movement and means operable by said shaft and engageable with said pinion upon unclamping of said detent member for applying a force thereto at a point spaced from the axis thereof and directed substantially only in a direction transverse to said axis.

3. In a hand brake, a pinion having a portion facing in a direction transverse to its axis, a manually rotatable shaft, means operable by said shaft for moving said pinion axially into a first predetermined position and into a second predetermined position, means rotatable by said shaft and engageable with said portion of said pinion in said first position for rotating said pinion, and clutch means operable by said pinion in said second position.

4. In a hand brake having a rotatable take-up drum, means for rotating said drum comprising a pinion drivingly connected with said drum and having a portion facing in a direction transverse to its axis and at an angle to a radius thereof, a manually rotatable shaft, means operable by said shaft for moving said pinion axially into a first predetermined position and into a second predetermined position, means rotatable by said shaft and engageable with said portion of said pinion in said first position for rotating said pinion, a detent member and clutch means engagebale by said pinion in said second position for rotating said detent member.

5. A hand brake mechanism comprising a rotatable take-up drum and means for rotating said drum comprising: a manually rotatable shaft; a pinion drivingly connected with said drum, said pinion having a stop engaging portion; a stop member rotatable by said shaft, said stop member being engageable with said stop engaging portion in a direction transverse to the axis of said pinion for rotating said pinion; a detent wheel mounted adjacent said pinion; a clutch disc mounted between said detent wheel and said pinion; a clutch member mounted adjacent said detent wheel on the side thereof remote from said pinion, said clutch member being rotatable by said shaft; and cam means operable by said shaft for moving said pinion axially in two directions.

6. A hand brake mechanism comprising a rotatable take-up drum and means for rotating said drum comprising: a manually rotatable shaft having a helical cam portion; a pinion drivingly connected with said drum and having a helical cam surface engageable with said helical cam portion for moving said pinion axially in two directions, said pinion having a stop engaging portion spaced radially from the axis of said pinion; a stop member mounted on said shaft and rotatable therewith, said stop member being engageable with said stop engaging portion in a direction transverse to said axis of said pinion with said pinion in a predetermined position; a detent wheel mounted on said shaft adjacent said pinion; a clutch disc mounted on said shaft between said detent wheel and said pinion; and a clutch member mounted on said shaft adjacent said detent wheel on the side thereof remote from said pinion, said clutch member being rotatable by said shaft.

7. A hand brake mechanism comprising a rotatable take-up drum and means for rotating said drum comprising: a manually rotatable shaft having a threaded portion; a threaded pinion drivingly connected with said drum and rotatably mounted on said threaded portion coaxial therewith and with the threads of said pinion engaged with the threads of said threaded portion for moving said pinion axially in two directions on said shaft, said pinion having a stop engaging portion spaced radially from the axis of said pinion; a stop member mounted on said shaft and rotatable therewith, said stop member being engageable with said stop engaging portion in a direction transverse to the axis of said pinion; a detent wheel mounted on said shaft adjacent said pinion; a clutch disc mounted on said shaft between said detent wheel and said pinion; and a clutch member mounted on said shaft adjacent said detent wheel on the side thereof remote from said pinion, said clutch member being rotatable by said shaft.

8. A hand brake mechanism comprising a rotatable take-up drum and means for rotating said drum comprising: a manually rotatable shaft having a threaded portion; a threaded pinion drivingly connected with said drum and rotatably mounted on said threaded portion coaxial therewith and with the threads of said pinion engaged with the threads of said threaded portion, said pinion having a stop engaging portion spaced radially from the axis of said pinion; a stop member mounted on said shaft and rotatable therewith, said stop member being tangentially engageable with said stop engaging portion; a detent wheel mounted on said shaft adjacent said pinion; a pair of clutch discs, one mounted on said shaft between said detent wheel and said pinion and the other mounted on said shaft on the opposite side of said detent wheel; and a clutch member mounted on said shaft adjacent said other clutch disc on the side thereof remote from said detent wheel, said clutch member being rotatable by said shaft.

9. A hand brake mechanism comprising a rotatable take-up drum and means for rotating said drum comprising: a manually rotatable shaft having a threaded portion; a threaded pinion drivingly connected with said drum and rotatably mounted on said threaded portion coaxial therewith and with the threads of said pinion engaged with the threads of said threaded portion, said pinion having a tangentially engageable stop engaging portion spaced radially from the axis of said pinion; a stop member mounted on said shaft on one side of said pinion, said stop member being rotatable with said shaft and engageable with said stop engaging portion for rotating said pinion; a detent wheel mounted on said shaft on the opposite side of said pinion and having a pair of opposite clutch faces; a pair of clutch discs, one mounted on said shaft between said detent wheel and said pinion and the other mounted on said shaft on the opposite side of said detent wheel; and a clutch member mounted on said shaft adjacent said other clutch disc on the side thereof remote from said detent wheel, said clutch member being rotatable by said shaft.

10. A hand brake mechanism comprising a rotatable take-up drum and means for rotating said drum comprising: a manually rotatable shaft having a clutch member thereon with a face perpendicular to the axis of said shaft and having a threaded portion adjacent said face; an internally threaded pinion drivingly connected with said drum and rotatably mounted on said threaded portion coaxial therewith and with the threads of said pinion engaged with the threads of said threaded portion, said pinion having a stop engaging portion spaced radially from the axis of said pinion and said stop engaging portion having a face lying in a plane parallel to and passing substantially through the axis of said pinion; a stop member mounted on said shaft on the side of said pinion remote from said clutch member, said stop member being rotatable by said shaft and engageable with the face of said stop engaging portion; a detent wheel mounted on said shaft and having a pair of opposite clutch faces perpendicular to the axis of said shaft; and a pair of clutch discs, one mounted on said shaft between said detent wheel and said pinion and the other mounted on said shaft between said detent wheel and the face of said clutch member.

11. A hand brake mechanism comprising a rotatable take-up drum and means for rotating said drum comprising: a manually rotatable shaft having a clutch member thereon with a face perpendicular to the axis of said shaft and having a threaded portion spaced axially from said clutch member; an internally threaded pinion drivingly connected with said drum and rotatably mounted on said threaded portion coaxial therewith and with the threads of said pinion engaged with the threads of said threaded portion, said pinion having a stop engaging portion spaced radially from the axis of said pinion and said stop engaging portion having a face lying in a plane parallel to and passing substantially through the axis of said pinion; a stop member comprising a collar mounted on said shaft on the side of said pinion remote from said clutch member, said collar being rotatable by said shaft and having a stop portion engageable with the face of said stop engaging portion with said pinion spaced from the remainder of said collar; a detent wheel mounted on said shaft and having a pair of opposite clutch faces perpendicular to the axis of said shaft; and a pair of clutch discs, one mounted on said shaft between said detent wheel and said pinion and the other mounted on said shaft between said detent wheel and the face of said clutch member.

12. A hand brake mechanism comprising a rotatable take-up drum and means for rotating said drum comprising: a manually rotatable shaft having an enlarged portion with a face perpendicular to the axis of said shaft and having a threaded portion spaced axially from said enlarged portion; an internally threaded pinion drivingly connected with said drum and rotatably mounted on said threaded portion coaxial therewith and with the threads of said pinion engaged with the threads of said threaded portion, said pinion having a stop engaging portion spaced radially from the axis of said pinion and said stop engaging portion having a face lying in a plane passing through the axis of said pinion; a stop member comprising a collar mounted on said shaft on the side of said pinion remote from said enlarged portion, said collar being fastened to said shaft and having an arcuate portion spaced radially from the axis of said shaft a distance at least equal to the distance of said stop engaging portion from the axis of said pinion, said arcuate portion having a face lying in a plane passing through the axis of said shaft and being engageable with the face of said stop engaging portion with said pinion spaced from the remainder of said collar; a detent wheel mounted on said shaft and having a pair of opposite clutch faces perpendicular to the axis of said shaft; and a pair of clutch discs, one mounted on said shaft between said detent wheel and said pinion and the other mounted on said shaft between said detent wheel and the face of said enlarged portion of said shaft.

13. A hand brake mechanism comprising a rotatable take-up drum and means for rotating said drum comprising: a manually rotatable shaft having an enlarged portion with a face perpendicular to the axis of said shaft and having a threaded portion spaced axially from said enlarged portion; an internally threaded pinion rotatably mounted on said threaded portion coaxial therewith and with the threads of said pinion engaged with the threads of said threaded portion, said pinion having a stop engaging portion spaced radially from the axis of said pinion and said stop engaging portion having a face lying in a plane passing through the axis of said pinion; a stop member comprising a collar mounted on said shaft on the side of said pinion remote from said enlarged portion, said collar being pinned to said shaft and having an arcuate portion spaced radially from the axis of said shaft a distance at least equal to the distance of said stop engaging portion from the axis of said pinion and said arcuate portion having a face lying in a plane passing through the axis of said shaft and being engageable with the face of said stop engaging portion with said pinion spaced from the remainder of said collar; a detent wheel mounted on said shaft and having a pair of opposite clutch faces perpendicular to the axis of said shaft, said wheel also having detent teeth on the periphery thereof; a pair of clutch discs, one mounted on said shaft between said detent wheel and said pinion and the other mounted on said shaft between said detent wheel and the face of said enlarged portion of said shaft; a gear drivingly connected with said drum and engaged with said pinion; and a stationary detent engaged with said detent teeth.

EVERARD C. MERSEREAU.

REFERENCES CITED

The following references are of record in the file of this patent:

UNITED STATES PATENTS

| Number | Name | Date |
| --- | --- | --- |
| Re. 22,427 | Van Cleave | Jan. 25, 1944 |
| 788,606 | Scott et al. | May 2, 1905 |
| 1,487,686 | Huntley | Mar. 18, 1924 |
| 1,860,549 | O'Connor | May 31, 1932 |
| 1,975,961 | Lindeman | Oct. 9, 1934 |
| 2,000,078 | Haseltine | May 7, 1935 |
| 2,267,037 | Mersereau | Dec. 23, 1941 |
| 2,280,180 | Van Cleave | Apr. 21, 1942 |
| 2,310,135 | Van Cleave | Feb. 2, 1943 |
| 2,313,602 | Van Cleave | Mar. 9, 1943 |
| 2,349,146 | Dickson | May 16, 1944 |
| 2,416,251 | Camp | Feb. 18, 1947 |